(12) United States Patent
China

(10) Patent No.: US 11,954,708 B2
(45) Date of Patent: Apr. 9, 2024

(54) INFORMATION PROCESSING DEVICE, DISPLAY SYSTEM, DISPLAY CONTROL METHOD

(71) Applicant: Sharp NEC Display Solutions, Ltd., Tokyo (JP)

(72) Inventor: Kanami China, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/944,806

(22) Filed: Sep. 14, 2022

(65) Prior Publication Data

US 2023/0017751 A1 Jan. 19, 2023

Related U.S. Application Data

(63) Continuation of application No. PCT/JP2021/010831, filed on Mar. 17, 2021.

(30) Foreign Application Priority Data

Mar. 17, 2020 (WO) .................. PCT/JP2020/011705

(51) Int. Cl.
*G06Q 30/00* (2023.01)
*G06F 3/01* (2006.01)
(Continued)

(52) U.S. Cl.
CPC ......... *G06Q 30/0271* (2013.01); *G06F 3/013* (2013.01); *G06V 40/10* (2022.01)

(58) Field of Classification Search
CPC ..... G06Q 30/0271; G06F 3/013; G06F 3/012; G06V 40/10; H04N 21/4223;
(Continued)

(56) References Cited

U.S. PATENT DOCUMENTS

| 6,873,710 B1* | 3/2005 | Cohen-Solal .......... G11B 27/10 |
| | | 382/181 |
| 2008/0004953 A1* | 1/2008 | Ma ..................... G06Q 30/0269 |
| | | 705/14.66 |

(Continued)

FOREIGN PATENT DOCUMENTS

| JP | 2007-214953 A | 8/2007 |
| JP | 2012-022538 A | 2/2012 |

(Continued)

OTHER PUBLICATIONS

International Search Report (ISR) (PCT Form PCT/ISA/210), in PCT/JP2021/010831, dated jun. 8, 2021.

(Continued)

*Primary Examiner* — Meredith A Long
(74) *Attorney, Agent, or Firm* — MCGINN I.P. LAW GROUP, PLLC

(57) ABSTRACT

At least a main area and a candidate area are provided on a display screen of a display device, and a display control unit that causes content displayed in the candidate area when reproduction of content displayed in the main area ends to be displayed in the main area, and a detection unit that detects a person from a captured image of at least a place where the display screen is visually recognizable are included, wherein the display control unit changes the content displayed in the candidate area depending on the person during reproduction of the content displayed in the main area.

13 Claims, 10 Drawing Sheets

(51) Int. Cl.
*G06Q 30/0251* (2023.01)
*G06V 40/10* (2022.01)

(58) Field of Classification Search
CPC ....... H04N 21/44008; H04N 21/44218; H04N 21/4532; H04N 21/4316; H04N 21/458; H04N 21/812
See application file for complete search history.

(56) References Cited

U.S. PATENT DOCUMENTS

2016/0379261 A1* 12/2016 Avalos ............... G06Q 30/0261
705/14.58
2018/0367580 A1* 12/2018 Marsh .................. G11B 27/105
2020/0045363 A1    2/2020 Nellore et al.

FOREIGN PATENT DOCUMENTS

| JP | 2012-134836 A | 7/2012 |
| JP | 2017-188824 A | 10/2017 |
| JP | 2019-159156 A | 9/2019 |
| KR | 10-2017-0055887 A | 5/2017 |

OTHER PUBLICATIONS

European Office Action with Search Report for EPO Application No. 21771004.5 dated Feb. 27, 2024.

* cited by examiner

FIG. 4

| ADVERTISEMENT | MAIN ADVERTISEMENT ID | THUMBNAIL ADVERTISEMENT ID |
|---|---|---|
| A | 1a | 2a |
| B | 1b | 2b |
| ... | ... | ... |

FIG. 5

| ADVERTISEMENT | GENDER | AGE | ... |
|---|---|---|---|
| A | FEMALE | TEENS TO TWENTIES | ... |
| B | MALE | ALL AGES | ... |
| ... | ... | ... | ... |

INFORMATION PROCESSING DEVICE, DISPLAY SYSTEM, DISPLAY CONTROL METHOD

TECHNICAL FIELD

The present invention relates to an information processing device, a display system, and a display control method.

Priority is claimed on PCT/JP2020/011705 filed Mar. 17, 2020, the content of which is incorporated herein by reference.

BACKGROUND ART

In electronic signboards such as digital signage, in order to provide content for appropriate advertisement to a viewing target, a method of initially displaying multiple pieces of content on a screen divided into parts of equal size and magnifying and displaying a most viewed content among the multiple pieces of content has been disclosed (refer to Patent Literature 1).

However, in the above-mentioned technology, since the next content to be magnified and displayed is not clearly indicated, an appealing effect that causes a target person to remain within the effective range of a content display device and leads to a purchase desire may be weakened.

CITATION LIST

Patent Literature

[Patent Literature 1]
Japanese Unexamined Patent Application, First Publication No. 2012-134836

SUMMARY OF INVENTION

Technical Problem

The problem to be solved is that it may not be possible to provide highly appealing content to a target within an effective range.

Solution to Problem

One aspect of the present invention is an information processing device including a display control unit which causes content displayed in a candidate area when reproduction of content displayed in a main area ends to be displayed in the main area, at least the main area and the candidate area being provided on a display screen of a display device, and a detection unit which detects a person from a captured image of at least a place where the display screen is visually recognizable, wherein the display control unit changes the content displayed in the candidate area depending on the person during reproduction of the content displayed in the main area.

Further, one aspect of the present invention is a display system including a display device which displays content for advertisements and an information processing device, wherein the information processing device includes a display control unit which causes content displayed in a candidate area when reproduction of content displayed in a main area ends to be displayed in the main area, at least the main area and the candidate area being provided on a display screen of a display device, and a detection unit which detects a person from a captured image of at least a place where the display screen is visually recognizable, wherein the display control unit changes the content displayed in the candidate area depending on the person during reproduction of the content displayed in the main area.

Further, one aspect of the present invention is a display control method including causing, by a display control unit, content displayed in a candidate area when reproduction of content displayed in a main area ends to be displayed in the main area, at least the main area and the candidate area being provided on a display screen of a display device, and detecting, by a detection unit, a person from a captured image of at least a place where the display screen is visually recognizable, wherein the display control unit changes the content displayed in the candidate area depending on the person during reproduction of the content displayed in the main area.

Further, one aspect of the present invention is an information processing device including a display control unit which causes content displayed in a candidate area when reproduction of content displayed in a main area ends to be displayed in the main area, at least the main area and the candidate area being provided on a display screen of a display device, and a detection unit that detects a person from a captured image of at least a place where the display screen is visually recognizable, wherein the display control unit determines a priority of content depending on the person during the reproduction of the content displayed in the main area and causes the content to be displayed in the candidate area according to the determined priority.

Advantageous Effects of Invention

It is possible to provide highly appealing content to a target within an effective range.

BRIEF DESCRIPTION OF DRAWINGS

FIG. 4 is a schematic diagram showing a data structure and a data example of an advertisement ID table stored in the information processing device.

FIG. 5 is a schematic diagram showing a data structure and a data example of an advertisement attribute table stored in the information processing device.

DESCRIPTION OF EMBODIMENTS

Hereinafter, embodiments of the present invention will be described.

Figure 1:
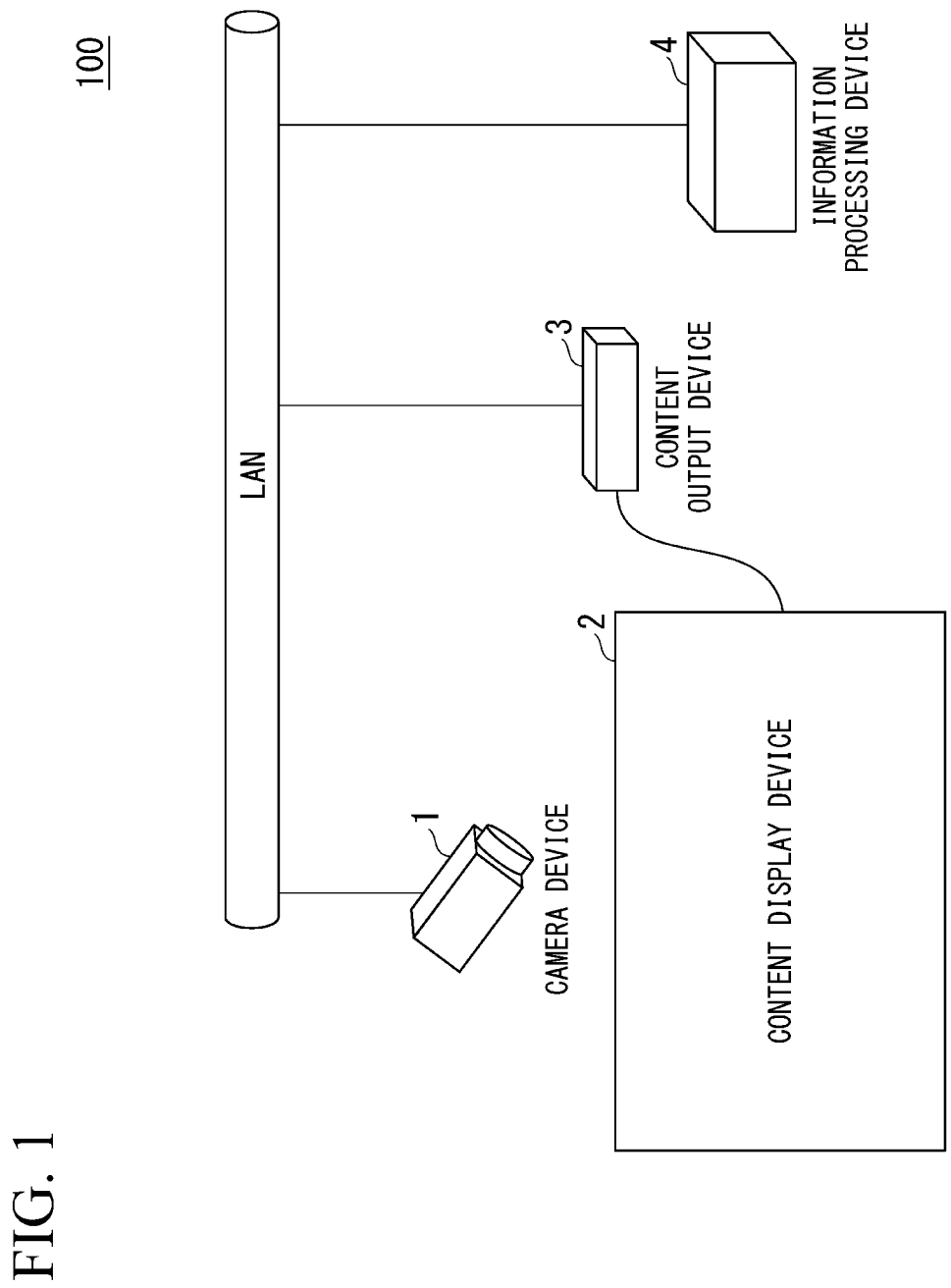
FIG. 1 is a schematic block diagram illustrating a configuration of a display system to which an information processing device according to an embodiment of the present invention is applied.

FIG. 1 is a schematic block diagram illustrating a configuration of a display system to which an information processing device according to an embodiment of the present invention is applied. In this embodiment, the display system 100 is a system that controls display of content to be displayed on an electronic signboard such as digital signage. The content is for advertisement and may be a still image or a moving image, and may or may not have audio.

In this figure, the display system 100 includes a camera device 1, a content display device 2, a content output device 3, and an information processing device 4.

The camera device 1, the content output device 3, and the information processing device 4 are connected through communication via a wired or wireless local area network (LAN). Further, the content display device 2 and the content output device 3 are connected via a video cable through which video signals are transmitted.

The camera device 1 is provided in the vicinity of the content display device 2 and captures an image of a person within an effective range in which a display screen of the content display device 2 can be viewed.

The content display device 2 displays content for an advertisement on the display screen.

The content output device 3 outputs a video signal of content to the content display device 2 and causes the content display device 2 to display the content.

The information processing device 4 is a computer that controls display of content to be displayed on the content display device 2.

FIG. 2A to FIG. 2F are image diagrams showing display examples of the content display device. The content display device 2 can display different pieces of advertisement content or the same advertisement content in a main area, which is the largest display area of the display screen, and a candidate area having a display area smaller than the main area. Advertisement content displayed in the main area and advertisement content displayed in the candidate area may be the same or different. Hereinafter, advertisement content displayed in the main area is referred to as a main advertisement, and advertisement content displayed in the candidate area is referred to as a thumbnail advertisement. A thumbnail advertisement may be text information, a moving image, a still image, or any combination thereof, may or may not have audio, and may be the same as the main advertisement of the advertisement or a thumbnail image (a moving image or a still image) of the main advertisement. Further, a thumbnail advertisement may be content related to content displayed as a main advertisement, and a part of the main advertisement may be used as a thumbnail advertisement.

A thumbnail advertisement displayed in a candidate area is an advertisement that is a candidate to be displayed next in the main area. That is, with respect to a main advertisement displayed in the main area, at the time of displaying the next main advertisement after reproduction of the displayed main advertisement ends, the content display device 2 displays any of thumbnail advertisements displayed in candidate areas as a main advertisement in the main area. Further, each candidate area is associated with a priority, and the content display device 2 disposes and displays thumbnail advertisements in candidate areas corresponding to the priorities.

Figure 2A:
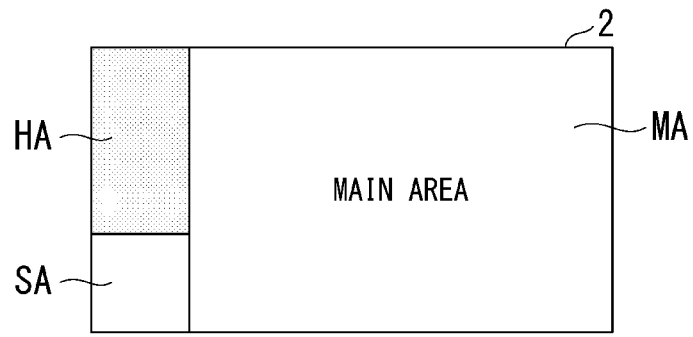
FIG. 2A is an image diagram showing a display example of a content display device.

In the example shown in FIG. 2A, the content display device 2 divides the display screen into a main area MA, a non-display area HA, and a candidate area SA and displays the same advertisement content or different pieces of advertisement content in the main area MA and the candidate area SA. The non-display area HA in black is an area in which no advertisement content is displayed. In the non-display area HA, advertisement content may not be displayed and an image in which the inside of the area is covered with a predetermined color such as black may be displayed.

Figure 2B:
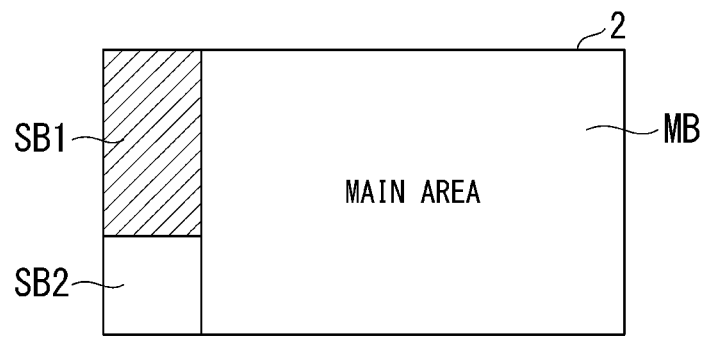
FIG. 2B is an image diagram showing a display example of the content display device.

In the example shown in FIG. 2B, the content display device 2 divides the display screen into a main area MB and two candidate areas SB1 and SB2 and displays different pieces of advertisement content or the same advertisement content in the respective areas. In the candidate area SB1 indicated as a shaded area, gray out is performed on a thumbnail advertisement. Accordingly, the thumbnail advertisement displayed in the candidate area SB1 can be viewed because it is in a gray out state, but it is displayed in gray instead of colors. A thumbnail advertisement may be displayed in colors in the candidate area SB2 represented in white. Accordingly, the candidate area SB2 that is easy to see may be set to a highest priority and the candidate area SB1 that is displayed in gray may be set to the second highest priority, for example. In this case, the content display device 2 displays the thumbnail advertisement having the highest priority in the candidate area SB2 and displays the thumbnail advertisement having the second highest priority in the candidate area SB1.

Figure 2C:
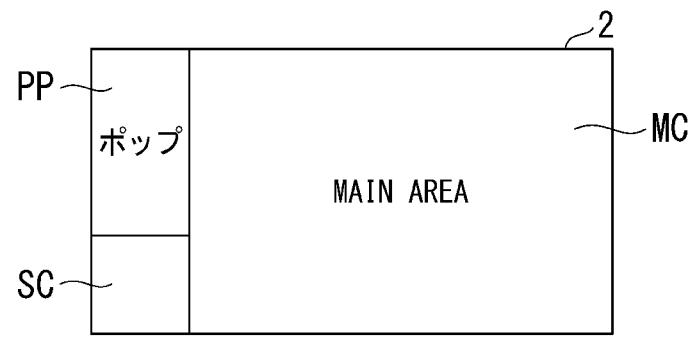
FIG. 2C is an image diagram showing a display example of the content display device.

In the example shown in FIG. 2C, the content display device 2 divides the display screen into a main area MC, a pop area PP, and a candidate area SC and displays different pieces of advertisement content or the same advertisement content in the main area MC and the candidate area SC. In the pop area PP, related information corresponding to a thumbnail advertisement displayed in the candidate area SC therebelow is displayed. The related information includes, for example, explanatory text regarding the thumbnail advertisement, and the like.

Figure 2D:
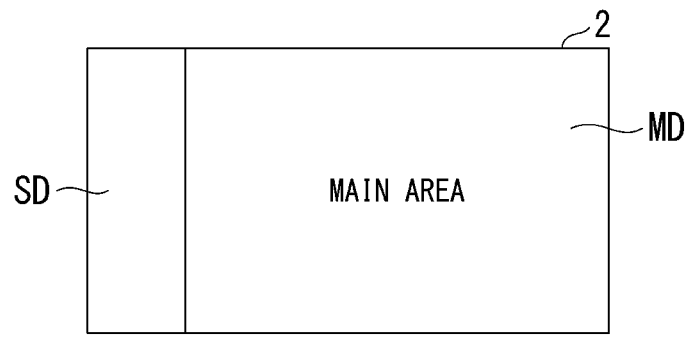
FIG. 2D is an image diagram showing a display example of the content display device.

In the example shown in FIG. 2D, the content display device 2 divides the display screen into a main area MD and a candidate area SD and displays different pieces of advertisement content or the same advertisement content in the respective areas.

Figure 2E:
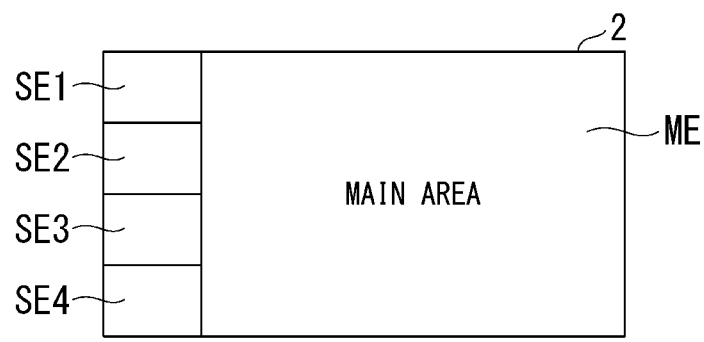
FIG. 2E is an image diagram showing a display example of the content display device.

In the example shown in FIG. 2E, the content display device 2 divides the display screen into a main area ME and four candidate areas SE1, SE2, SE3 and SE4 and displays different pieces of advertisement content in the respective areas. However, the advertisement content displayed in the main area ME may be the same as the advertisement content displayed in any of the candidate areas. The candidate areas SE1 to SE4 are disposed in a vertical row on the left side of the main area ME when the display screen is viewed from the front. For example, increasing priority may be assigned in the order of the candidate area SE1, the candidate area SE2, the candidate area SE3, and the candidate area SE4. For example, a thumbnail advertisement having a higher priority can be allocated to an area displayed closer to the upper side of the display screen. In this case, the content display device 2 displays a thumbnail advertisement having the highest priority in the candidate area SE1, displays a thumbnail advertisement having the second highest priority in the candidate area SE2, displays a thumbnail advertisement having the third highest priority in the candidate area SE3, and displays a thumbnail advertisement having the fourth highest priority in the candidate area SE4. Further, in the example of FIG. 2E, each candidate area (SE1, SE2, SE3 and SE4) may be disposed on the right side of the main area ME when the display screen is viewed from the front.

Figure 2F:
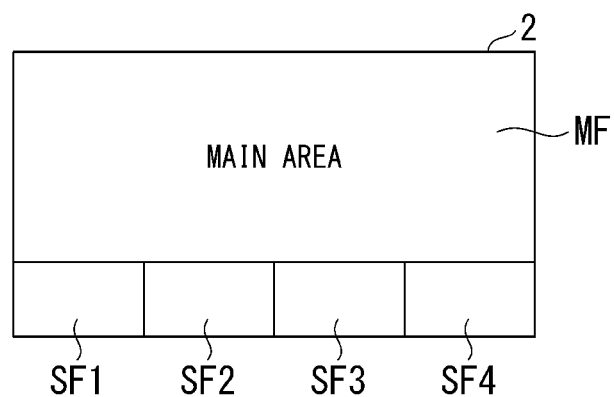
FIG. 2F is an image diagram showing a display example of the content display device.

In the example shown in FIG. 2F, the content display device 2 divides the display screen into a main area MF and four candidate areas SF1, SF2, SF3, and SF4 and displays different pieces of advertisement contents in the respective areas. However, the advertisement content displayed in the main area MF may be the same as the advertisement content displayed in any of the candidate areas. The candidate areas SF1 to SF4 are disposed in a horizontal row below the main area MF when the display screen is viewed from the front. For example, increasing priority may be assigned in the order of the candidate area SF1, the candidate area SF2, the candidate area SF3, and the candidate area SF4. For example, a thumbnail advertisement having a higher priority can be allocated to an area displayed closer to the left side of the display screen. In this case, the content display device 2 displays a thumbnail advertisement having the highest priority in the candidate area SF1, displays a thumbnail advertisement having the second highest priority in the candidate area SF2, displays a thumbnail advertisement having the third highest priority in the candidate area SF3, and displays a thumbnail advertisement having the fourth highest priority in the candidate area SF4. Meanwhile, a priority may not be set for each of the candidate areas SF1 to SF4 and, in this case, each thumbnail advertisement is displayed in any of the four candidate areas SF1 to SF4 regardless of the priorities of the thumbnail advertisements. Further, in the example of FIG. 2F, each candidate area (SF1, SF2, SF3, and SF4) may be disposed above the main area MF when the display screen is viewed from the front.

Although an example in which the display screen of the content display device 2 has a horizontally long rectangular shape having a length in the traverse direction (horizontal direction) greater than a length in the longitudinal direction (vertical direction) in a state in which the content display device 2 has been installed is described in the present embodiment, the present invention is not limited thereto and may be realized in any shape, resolution, or the like such as a vertically long screen. Further, the division pattern of the display screen of the content display device 2 is not limited to the above-described ones and may be realized at any position and ratio, and with any number of divisions.

Figure 3:
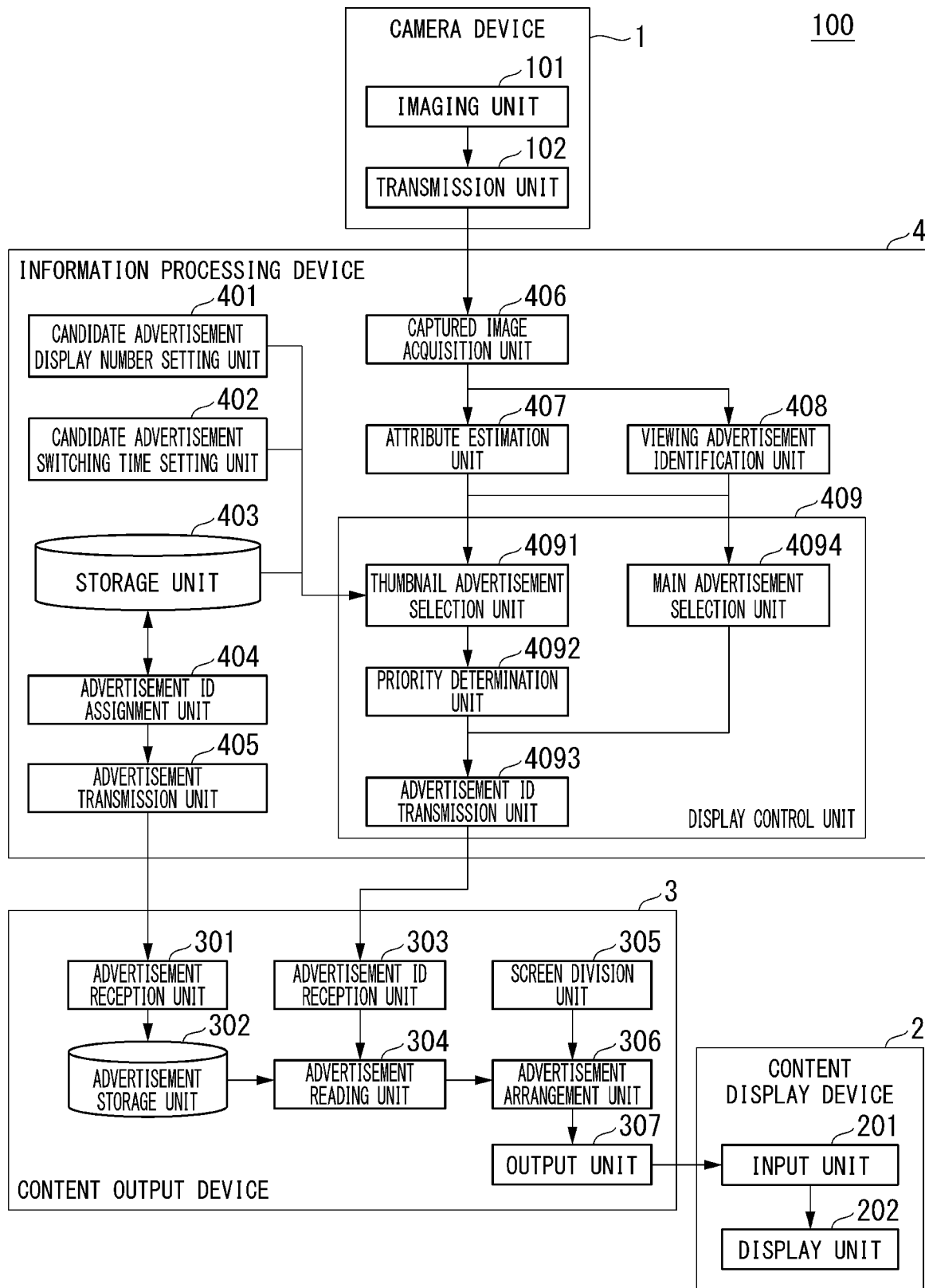
FIG. 3 is a schematic block diagram showing a functional configuration of the display system.

FIG. 3 is a schematic block diagram showing a functional configuration of the display system.

The camera device 1 includes an imaging unit 101 and a transmission unit 102.

The imaging unit 101 captures an image of a person within an effective range in which the display screen of the content display device 2 can be viewed at an arbitrary frame rate to generate the captured image.

The transmission unit 102 transmits the captured image generated by the imaging unit 101 to the information processing device 4.

The information processing device 4 includes a candidate advertisement display number setting unit 401, a candidate advertisement switching time setting unit 402, a storage unit 403, an advertisement ID assignment unit 404, an advertisement transmission unit 405, a captured image acquisition unit 406, an attribute estimation unit 407, a viewing advertisement identification unit 408, and a display control unit 409. The information processing device 4 may be a computer.

The candidate advertisement display number setting unit 401, the candidate advertisement switching time setting unit 402, the advertisement ID assignment unit 404, the advertisement transmission unit 405, the captured image acquisition unit 406, the attribute estimation unit 407, the viewing advertisement identification unit 408, and the display control unit 409 may be configured as, for example, a processing device such as a central processing unit (CPU) or a dedicated electronic circuit.

The storage unit 403 is configured as a storage medium, for example, a hard disk drive (HDD), a flash memory, an electrically erasable programmable read only memory (EEPROM), a random access read/write memory (RAM), a read only memory (ROM), or any combination thereof. As the storage unit 403, for example, a non-volatile memory can be used.

The candidate advertisement display number setting unit 401 sets the number of thumbnail advertisements to be displayed on the content display device 2 (hereinafter, referred to as a "thumbnail advertisement display number"). That is, the candidate advertisement display number setting unit 401 sets the number of candidate areas by indicating it to the display control unit 409. For example, the candidate advertisement display number setting unit 401 receives input of a thumbnail advertisement display number on the basis of an operation input from a user through an input device. The input device may be, for example, a keyboard, a mouse, and the like, which may be connected to the information processing device 4 in a wired or wireless manner.

The candidate advertisement switching time setting unit 402 sets a time for switching thumbnail advertisements to be displayed in candidate areas (hereinafter referred to as a "thumbnail advertisement switching time"). For example, the candidate advertisement switching time setting unit 402 receives input of a thumbnail advertisement switching time on the basis of an operation input from the user through the input device. Further, the candidate advertisement switching time setting unit 402 indicates the input thumbnail advertisement switching time to the display control unit 409.

The storage unit 403 stores various types of information. For example, the storage unit 403 stores each piece of advertisement content (main advertisement and thumbnail advertisement). Further, the storage unit 403 stores an advertisement ID table showing an advertisement ID for identifying each piece of advertisement content and an advertisement attribute table showing attributes of a person who is a target of each advertisement.

A thumbnail advertisement may be content related to a main advertisement. For example, a thumbnail advertisement may be content generated on the basis of at least some of a plurality of frames constituting a main advertisement. For example, when a main advertisement is moving image data, some frames selected from a plurality of frames constituting the moving image data can be used as a thumbnail advertisement. For example, when one frame is selected, this frame can be used as so-called still image content to be displayed for a reproduction period. Further, when a plurality of frames are selected, these may be content obtained by cutting out a part corresponding to a part of a reproduction time of the main advertisement. In this case, the thumbnail advertisement is moving image data that is a part of reproduced sections of the moving image data of the main advertisement. A thumbnail advertisement may be generated in advance and stored in the storage unit 403. Further, the information processing device 4 may be provided with a content editing unit, and this content editing unit may generate a thumbnail advertisement from content which is a main advertisement stored in the storage unit 403 and store the thumbnail advertisement in the storage unit 403.

The advertisement ID assignment unit 404 assigns a main advertisement ID and a thumbnail advertisement ID to each advertisement. A main advertisement ID is an advertisement ID for identifying a main advertisement. A thumbnail advertisement ID is an advertisement ID for identifying a thumbnail advertisement. The advertisement ID assignment unit 404 may issue a main advertisement ID and a thumbnail advertisement ID, assign the issued main advertisement ID to a main advertisement, and assign the thumbnail advertisement ID to a thumbnail advertisement. The advertisement ID assignment unit 404 writes the main advertisement ID and the thumbnail advertisement ID assigned to each advertisement in the advertisement ID table stored in the storage unit 403.

The advertisement transmission unit 405 transmits each piece of advertisement content (main advertisement and thumbnail advertisement) to the content output device 3 in association with the main advertisement ID and the thumbnail advertisement ID.

The captured image acquisition unit 406 acquires a captured image by receiving the captured image from the camera device 1.

The attribute estimation unit 407 can detect each person within an effective range on the basis of a captured image and estimates attributes of a detected person. Further, the attribute estimation unit 407 detects a person from an image captured such that it includes a place where the display screen of the display device can be visually recognized and estimates attributes of the detected person. The effective range may be a range of an area including a place where content can be viewed.

The viewing advertisement identification unit 408 estimates the direction of a line of sight of each person within the effective range on the basis of a captured image and identifies an advertisement that is being viewed by each person on the basis of the estimated direction of the line of sight. For example, the viewing advertisement identification unit 408 estimates whether the destination of the line of sight is the display screen of the content display device 2 and faces any one of display areas of the display screen. If the destination of the line of sight is any of candidate areas, the viewing advertisement identification unit 408 identifies the candidate area. The viewing advertisement identification unit 408 identifies a thumbnail advertisement displayed in the identified candidate area to identify it as an advertisement that is being viewed by the person.

Further, if the destination of the line of sight is a main area, the viewing advertisement identification unit 408 can identify an advertisement displayed in the main area to identify it as an advertisement that is being viewed by the person.

If a plurality of people are included in the effective range of a captured image, the viewing advertisement identification unit 408 performs such an advertisement for each of the people.

The display control unit 409 controls display of content to be displayed on the content display device 2. When the display area of the display screen is divided into a plurality of areas, content (main advertisement) is being reproduced in a main area among the plurality of areas and reproduction of the content ends, the display control unit 409 ends reproduction of content (thumbnail advertisement) reproduced in a candidate area among the plurality of areas and causes content depending on estimated attributes to be reproduced.

Specifically, the display control unit 409 causes different pieces of advertisement content to be displayed in a main area, which is the largest display area among areas obtained by dividing the display screen of the content display device 2, and candidate areas smaller than the main area. Further, the display control unit 409 switches display of advertisements to be displayed in the candidate areas by displaying a currently displayed thumbnail advertisement and displaying a next thumbnail advertisement to be displayed on the basis of attributes of a person within an effective range in which the display screen of the content display device 2 can be viewed. Further, at the time of switching advertisements displayed in the main area, the display control unit 409 may cause a most viewed advertisement among advertisements displayed in candidate areas to be displayed in the main area. When most viewed content is identified, the display control unit 409 may identify a candidate area in the direction of a line of sight for each line of sight and identify content displayed in a candidate area to which the largest number of lines of sights is directed as the most viewed content. Further, a time for which a line of sight is directed to a candidate area may be measured, and a candidate area having the longest time for which a line of sight is directed may be identified as the most viewed content. If there are lines of sight of multiple people, a total value of times for the lines of sight may be obtained for each candidate area and content of a candidate area having the highest total value may be identified as the most viewed content.

Here, the display control unit 409 displays the most viewed advertisement in a candidate area again at the time of switching advertisements to be displayed in the candidate areas. Further, the display control unit 409 assigns a priority to an advertisement to be displayed in a candidate area on the basis of attributes of a person and displays each advertisement in the candidate area corresponding to the priority. For example, the display control unit 409 assigns a priority to each of a plurality of pieces of content on the basis of estimated attributes and displays content for which a priority corresponding to the priority assigned to the candidate area is set in the candidate area.

Further, the display control unit 409 assigns the highest priority to the most viewed advertisement at the time of switching advertisements to be displayed in the candidate areas. Further, at the time of switching advertisements to be displayed in the candidate areas, the display control unit 409 assigns priorities on the basis of the number of views when all advertisements selected on the basis of attributes of a person match advertisements displayed in the candidate areas. Further, at the time of switching advertisements to be displayed in the candidate areas, the display control unit 409 switches the advertisements to advertisements other than the advertisement displayed in the main area.

Further, the display control unit 409 can also select content to be displayed in the candidate areas on the basis of priorities depending on attributes estimated on the basis of a person detected from a captured image and priorities assigned to content on the basis of an identified result.

Further, the display control unit 409 may change content displayed in the candidate areas to other content depending on a person.

Further, the display control unit 409 may rearrange content displayed in candidate areas depending on a person.

If a person is not detected by a detection unit during reproduction of content displayed in the main area, the display control unit 409 displays content that is not dependent on a person in the candidate areas.

The display control unit 409 includes a thumbnail advertisement selection unit 4091, a priority determination unit 4092, an advertisement ID transmission unit 4093, and a main advertisement selection unit 4094.

The thumbnail advertisement selection unit 4091 selects thumbnail advertisements to be displayed on the content display device 2 on the basis of attributes of a person within the effective range and a thumbnail advertisement that is being viewed.

The priority determination unit 4092 determines a priority of each thumbnail advertisement selected by the thumbnail advertisement selection unit 4091 on the basis of the attributes of the person within the effective range and the thumbnail that is advertisement being viewed.

The advertisement ID transmission unit 4093 transmits the thumbnail advertisement ID of each thumbnail advertisement selected by the thumbnail advertisement selection unit 4091 to the content output device 3 along with the priority thereof. Further, the advertisement ID transmission unit 4093 transmits a main advertisement ID of a main advertisement selected by the main advertisement selection unit 4094 to the content output device 3.

The main advertisement selection unit 4094 selects a main advertisement to be displayed on the content display device 2 on the basis of the thumbnail advertisement that is being viewed.

The content output device 3 includes an advertisement reception unit 301, an advertisement storage unit 302, an advertisement ID reception unit 303, an advertisement reading unit 304, a screen division unit 305, an advertisement arrangement unit 306, and an output unit 307. The content output device 3 may be a computer.

The advertisement reception unit 301, the advertisement ID reception unit 303, the advertisement reading unit 304, the screen division unit 305, the advertisement arrangement unit 306, and the output unit 307 may be configured, for example, as a processing device such as a central processing unit (CPU) or a dedicated electronic circuit.

The advertisement storage unit 302 is configured as a storage medium, for example, an HDD, a flash memory, an EEPROM, a RAM, a ROM, or any combination thereof. As the storage unit 403, for example, a non-volatile memory can be used.

The advertisement reception unit 301 receives each piece of advertisement content (main advertisement and thumbnail advertisement) from the information processing device 4 along with the main advertisement ID and the thumbnail advertisement ID thereof and writes the received advertisement content (main advertisement and thumbnail advertisement) in the advertisement storage unit 302 in association with the main advertisement ID and the thumbnail advertisement ID thereof.

The advertisement storage unit 302 stores each piece of advertisement content (main advertisement and thumbnail advertisement) in association with the main advertisement ID and the thumbnail advertisement ID thereof.

The advertisement ID reception unit 303 receives advertisement IDs of content to be displayed on the content display device 2 from the information processing device 4.

The advertisement reading unit 304 reads the advertisement content corresponding to the advertisement IDs received from the information processing device 4 from the advertisement storage unit 302.

The screen division unit 305 divides the display area of the display screen of the content display device 2 into a main area and a candidate area. When a plurality of thumbnail advertisement IDs (thumbnail advertisement display number) are received from the information processing device 4, the screen division unit 305 divides the display screen into candidate areas matching the number of received thumbnail advertisement IDs. At this time, the screen division unit 305 assigns a priority to each of the divided candidate areas. For example, the screen division unit 305 assigns a higher priority to a candidate area having a larger display area. For example, the screen division unit 305 assigns a priority to each of the candidate areas according to an arrangement state of the candidate areas. For example, when the candidate areas are arranged in the vertical direction as shown in FIG. 2E, a higher priority is assigned to a candidate area closer to the top of the screen. Further, when the candidate areas are arranged in the horizontal direction as shown in FIG. 2F, for example, a higher priority is assigned to a candidate area closer to the left end or the right end of the screen.

The advertisement arrangement unit 306 generates a video signal in which advertisement content read from the advertisement storage unit 302 is disposed in each divided area of the display screen of the content display device 2. Specifically, the advertisement arrangement unit 306 resizes a main advertisement and disposes it in the main area. Further, the advertisement arrangement unit 306 rearranges thumbnail advertisements to be displayed in a plurality of candidate areas depending on the priorities thereof. Then, the advertisement arrangement unit 306 resizes each thumbnail advertisement and disposes it in each candidate area depending on the priority thereof.

The output unit 307 outputs the video signal generated by the advertisement arrangement unit 306 to the content display device 2.

The content display device 2 includes an input unit 201 and a display unit 202. The content display device 2 is, for example, a liquid crystal display device. Further, the content display device 2 may be a projector instead of a liquid crystal display device.

The input unit 201 receives a video signal from the content output device 3.

The display unit 202 has a display screen and displays an input video signal on the display screen. When the content display device 2 is a projector, the display unit 202 may project a video signal on a projection surface.

FIG. 4 is a schematic diagram showing a data structure and a data example of the advertisement ID table stored in the information processing device.

As shown in the figure, the advertisement ID table stores items of an advertisement, a main advertisement ID, and a thumbnail advertisement ID in association with each other. The main advertisement ID is an advertisement ID for identifying a main advertisement. The thumbnail advertisement ID is an advertisement ID for identifying a thumbnail advertisement. The main advertisement ID and the thumbnail advertisement ID have corresponding advertisement IDs. For example, a main advertisement ID of advertisement A is "1a" and a thumbnail advertisement ID thereof is "2a."

In this example, "a" common to the main advertisement ID and the thumbnail advertisement ID of advertisement A indicates that the advertisement is "A," "1" of the main advertisement ID indicates that it is the main advertisement ID, and "2" of the thumbnail advertisement ID indicates that it is the thumbnail advertisement ID. Similarly, a main advertisement ID of advertisement B is "1b" and a thumbnail advertisement ID thereof is "2b."

FIG. 5 is a schematic diagram showing a data structure and a data example of the advertisement attribute table stored in the information processing device.

As shown in the figure, the advertisement ID table stores items of an advertisement and attributes of a person who is a target of the advertisement in association with each other. In the illustrated example, attributes of a person include a gender and an age. For example, a person who is a target of advertisement A has attributes of a gender "female" and an age corresponding to "teens to twenties." In addition, a person who is a target of advertisement B has attributes of a gender "male" and an age corresponding to "all ages."

Next, the operation of the display system 100 will be described.

Figure 6:
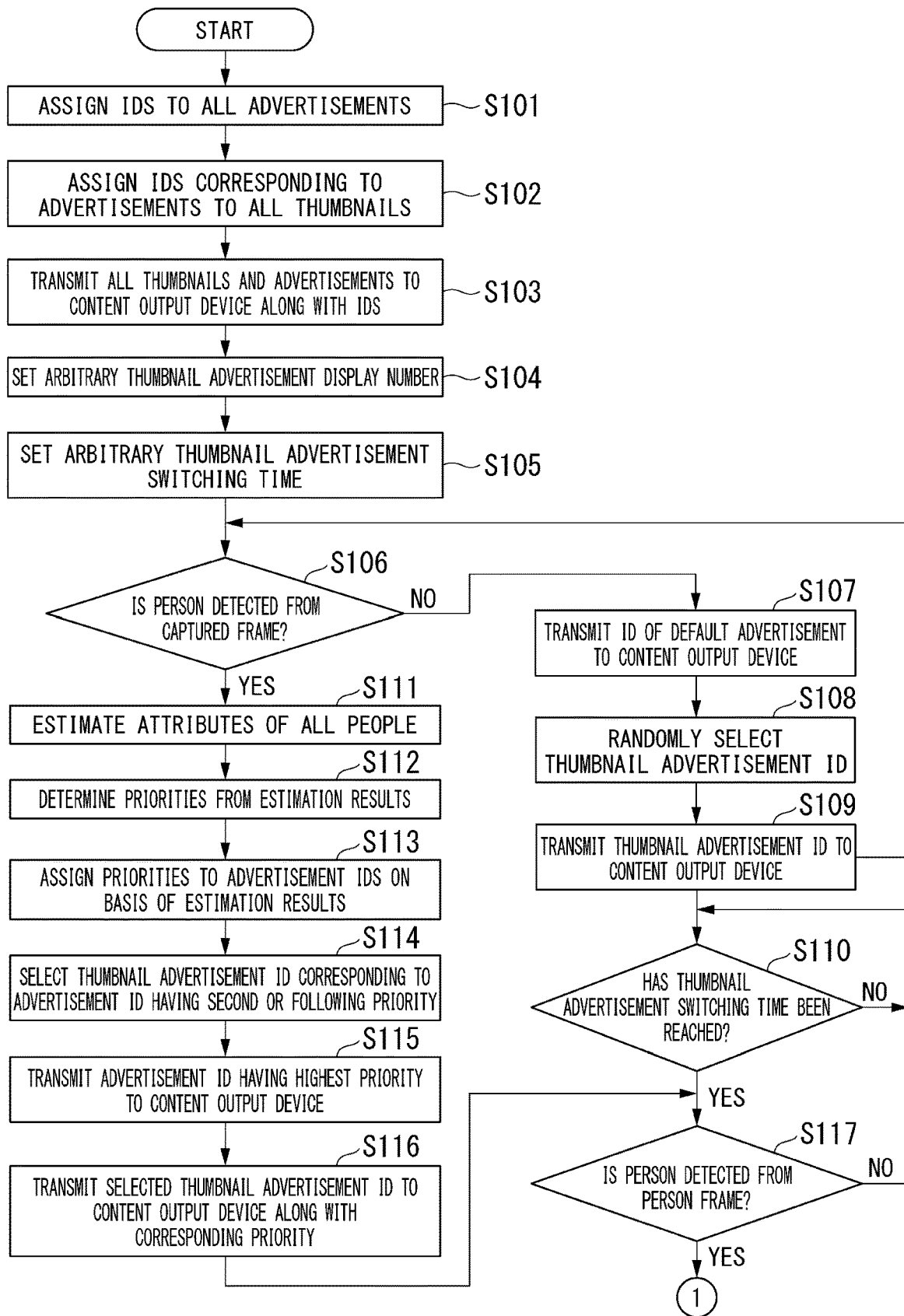
FIG. 6 is a flowchart illustrating an operation of display control processing executed by the information processing device.
Figure 7:
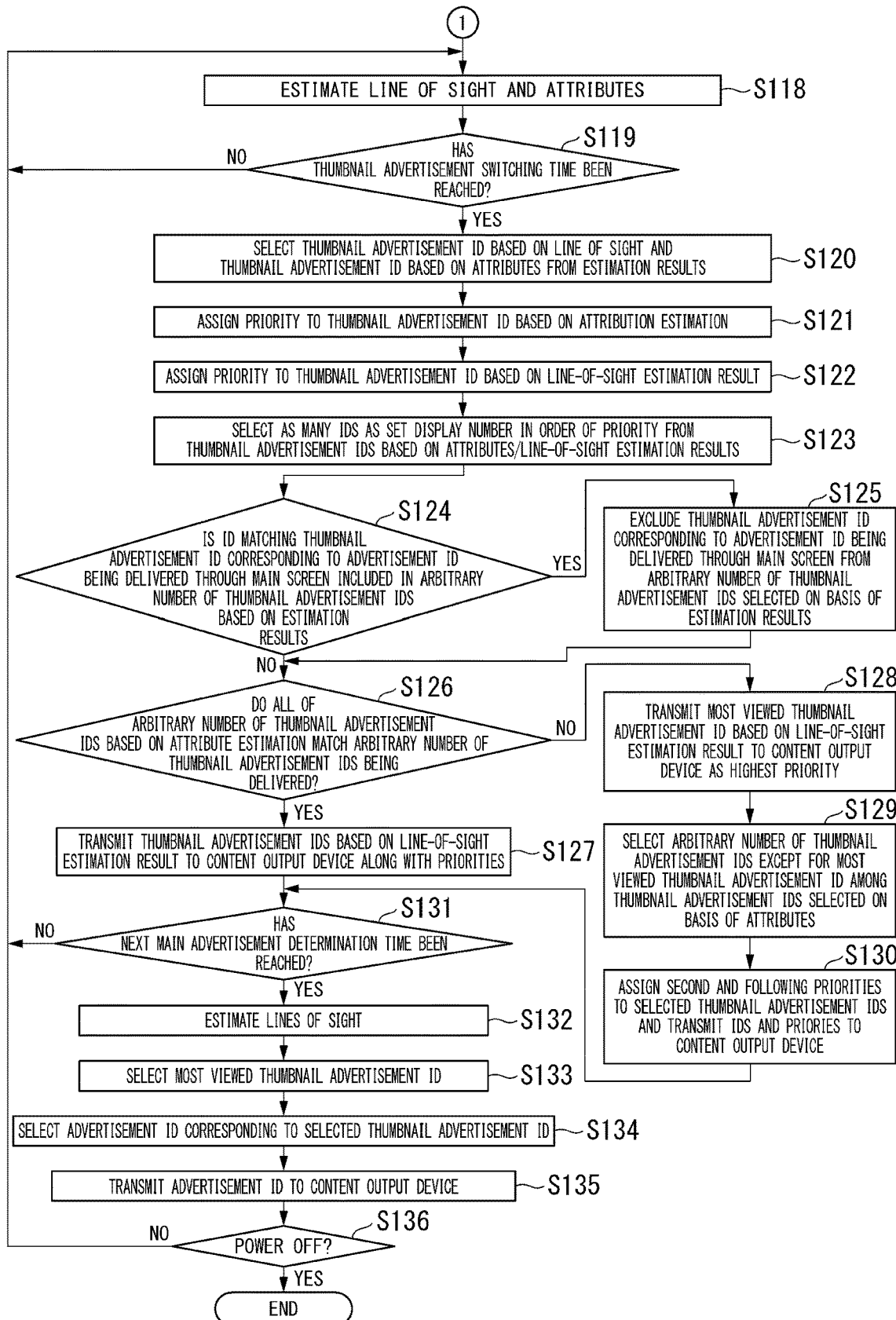
FIG. 7 is a flowchart illustrating an operation of display control processing executed by the information processing device.

FIG. 6 and FIG. 7 are flowcharts illustrating an operation of display control processing executed by the information processing device. The information processing device 4 executes processing shown in these figures at the time of displaying content on the content display device 2.

First, the advertisement ID assignment unit 404 assigns main advertisement IDs to all main advertisements stored in the storage unit 403 (step S101) and writes them in the advertisement ID table stored in the storage unit 403. Subsequently, the advertisement ID assignment unit 404 assigns thumbnail advertisement IDs corresponding to main advertisement IDs to all thumbnail advertisements (step S102) and writes them in the advertisement ID table stored in the storage unit 403. Then, the advertisement transmission unit 405 transmits main advertisements and thumbnail advertisements of all advertisements to the content output device 3 along with the main advertisement IDs and the thumbnail advertisement IDs (step S103).

Next, the candidate advertisement display number setting unit 401 sets a thumbnail advertisement display number (step S104). The candidate advertisement display number setting unit 401 transmits the set thumbnail advertisement display number to the content output device 3 via the advertisement transmission unit 405. Subsequently, the candidate advertisement switching time setting unit 402 sets a thumbnail advertisement switching time (step S105).

Next, the captured image acquisition unit 406 acquires a captured image from the camera device 1 and determines whether or not a person has been detected from a captured frame of the acquired captured image (step S106). If no person has been detected from the captured frame (NO in step S106), the display control unit 409 outputs a main advertisement ID of a preset default advertisement (hereinafter referred to as a "default advertisement") to the content output device 3 (step S107). Subsequently, the display control unit 409 randomly selects as many thumbnail advertisement IDs as the thumbnail advertisements display number (step S108). Then, the display control unit 409 transmits the selected thumbnail advertisement IDs to the content output device 3 (step S109). Subsequently, the display control unit 409 determines whether or not the thumbnail advertisement switching time has been reached (the thumbnail advertisement switching time has elapsed since thumbnail advertisements were displayed) (step S110). If the thumbnail advertisement switching time has not been reached (NO in step S110), processing of step S110 is repeated. On the other hand, if the thumbnail advertisement switching time has been reached (YES in step S110), processing proceeds to step S117.

That is, at the time of initially displaying content on the content display device 2, the display control unit 409 displays default advertisement content in the main area and displays randomly selected thumbnail advertisements in the candidate areas if there is no person within the effective range of the content display device 2.

On the other hand, if people have been detected from the captured frame (YES in step S106), the attribute estimation unit 407 estimates attributes of all the people detected from the captured frame (step S111). Subsequently, the display control unit 409 determines a priority of each advertisement on the basis of the estimated attributes (step S112). For example, the display control unit 409 increases the priority of an advertisement having a large number of people matching the attributes. Then, the display control unit 409 assigns the determined priority to the corresponding advertisement (step S113). Subsequently, the display control unit 409 selects as many thumbnail advertisement IDs of advertisements having the second and following priorities as the thumbnail advertisement display number in descending order of priority (step S114). Subsequently, the display control unit 409 transmits the main advertisement ID of the advertisement having the highest priority to the content output device 3 (step S115). Subsequently, the display control unit 409 transmits the selected thumbnail advertisement IDs corresponding to the thumbnail advertisement display number to the content output device 3 along with their priorities (step S116).

That is, at the time of initially displaying advertisements on the content display device 2, the display control unit 409 selects advertisements on the basis of the attributes of all people within the effective range, displays the advertisement having the highest priority based on the attributes in the main area, and displays advertisements having the second and following priorities in the candidate areas in the order of their priorities if there are people within the effective range of the content display device 2.

Subsequently, the captured image acquisition unit 406 acquires a captured image from the camera device 1 and determines whether or not a person has been detected from a captured frame of the acquired captured image (step S117). If no person is detected from the captured frame (NO in step S117), processing returns to step S110. That is, when no person is detected from the captured frame, the display control unit 409 does not change the main advertisement and thumbnail advertisements that are being displayed (being delivered).

On the other hand, when people have been detected from the captured frame (YES in step S117), the viewing advertisement identification unit 408 estimates lines of sight of all the people detected from the captured frame, and the attribute estimation unit 407 estimates attributes of all the people detected from the captured frame (step S118). Subsequently, the display control unit 409 determines whether or not the thumbnail advertisement switching time has been reached (step S119). If the thumbnail advertisement switching time has not been reached (NO in step S119), processing returns to processing of step S118.

On the other hand, when the thumbnail advertisement switching time has been reached (YES in step S119), the display control unit 409 selects thumbnail advertisement IDs based on the lines of sight and thumbnail advertisement IDs based on the attributes from the estimation results (step S120). For example, the display control unit 409 selects the thumbnail advertisement ID of a thumbnail advertisement currently displayed (delivered) in a candidate area as the thumbnail advertisement ID based on the lines of sight. Further, the display control unit 409 selects the thumbnail advertisement ID of an advertisement that matches the estimated attribute as the thumbnail advertisement ID based on the attributes.

Subsequently, the display control unit 409 assigns priorities to the thumbnail advertisement IDs based on the attributes (step S121). Subsequently, the display control unit 409 assigns priorities to the thumbnail advertisement IDs based on the lines of sight (step S122). For example, the display control unit 409 increases the priority of a thumbnail advertisement having a large number of views. Subsequently, the display control unit 409 selects as many thumbnail advertisement IDs as the thumbnail advertisement display number in descending order of priority for each of the thumbnail advertisement IDs based on the attributes and the thumbnail advertisement IDs based on the lines of sight (step S123).

Subsequently, the display control unit 409 determines whether or not the selected thumbnail advertisement IDs based on the attributes include a thumbnail advertisement ID matching the thumbnail advertisement ID corresponding to the main advertisement currently displayed (delivered) in the main area (step S124). If the selected thumbnail advertisement IDs include matching one (YES in step S124), the display control unit 409 excludes the thumbnail advertisement ID of the main advertisement that is being delivered through the main area from the selected thumbnail advertisement IDs based on the attributes (step S125). As a result, the thumbnail advertisement corresponding to the main advertisement that is being delivered through the main area is not delivered to a candidate area, and the same main advertisement can be prevented from being delivered twice in a row.

On the other hand, if the selected thumbnail advertisement IDs based on the attributes do not include the thumbnail advertisement ID of the main advertisement that is being delivered through the main area (NO in step S124), the display control unit 409 determines whether or not all the selected thumbnail advertisement IDs based on the attributes match the thumbnail advertisement IDs of the thumbnail advertisements that are being delivered through the candidate areas (step S126). If all match (YES in step S126), the display control unit 409 transmits the thumbnail advertisement IDs based on the lines of sight to the content output device 3 along with their priorities (step S127).

That is, if all the thumbnail advertisement IDs based on the attributes match the thumbnail advertisements that are being delivered, the display control unit 409 changes the arrangement positions of the thumbnail advertisements on the basis of the number of views thereof without switching the thumbnail advertisements to be displayed in the candidate areas. For example, the display control unit 409 can dispose a thumbnail advertisement having a larger number of views in a candidate area that is easier to view.

On the other hand, when even some of the selected thumbnail advertisement IDs based on the attributes do not match the thumbnail advertisement IDs of the thumbnail advertisements that are being delivered through the candidate areas (NO in step S126), the display control unit 409 increases the priority of the thumbnail advertisement ID of the most viewed thumbnail advertisement among the thumbnail advertisements that are being delivered to the highest priority and transmits the thumbnail advertisement ID to the content output device 3 along with the highest priority (step S128). Subsequently, the display control unit 409 excludes the thumbnail advertisement ID of the most viewed thumbnail advertisement from the thumbnail advertisement IDs based on the attributes, and selects as many thumbnail advertisement IDs as the thumbnail advertisement display number−1 (the number obtained by subtracting 1 from the thumbnail advertisement display number) in descending order of priority (step S129). Subsequently, the display control unit 409 reassigns the second and following priorities to the selected thumbnail advertisement IDs in descending order of priority and transmits the selected thumbnail advertisement IDs to the content output device 3 along with the reassigned priorities. (Step S130). In order to avoid redundancy, the thumbnail advertisement IDs transmitted at this time do not include the most viewed thumbnail advertisement ID.

That is, when the thumbnail advertisement IDs based on the attribute are partially different from the thumbnail advertisements that are being delivered, the display control unit 409 keeps the most viewed thumbnail advertisement and switches the other thumbnail advertisements. At this time, the display control unit 409 can dispose the most viewed thumbnail advertisement in a most easily viewed candidate area or the like by assigning the highest priority to the most viewed thumbnail advertisement.

Subsequently, the display control unit 409 determines whether or not a time for determining the next main advertisement has been reached (step S131). A time for determining a main advertisement is, for example, a predetermined time before a time when a main advertisement that is being delivered ends. If the time for determining the next main advertisement has not been reached (NO in step S131), processing returns to processing of step S118.

On the other hand, when the time for determining the next main advertisement has been reached (YES in step S131), the viewing advertisement identification unit 408 estimates the line of sight of each person detected from the captured frame and identifies the advertisement that is being viewed by each person (Step S132). Subsequently, the display control unit 409 selects the thumbnail advertisement ID of the most viewed thumbnail advertisement (step S133). Subsequently, the display control unit 409 reads the main advertisement ID corresponding to the selected thumbnail advertisement ID from the advertisement ID table (step S134). The display control unit 409 transmits the read main advertisement ID to the content output device 3 (step S135).

That is, at the time of switching the main advertisement displayed in the main area, the display control unit 409 displays the main advertisement of the most viewed thumbnail advertisement in the main area.

Subsequently, the information processing device 4 determines whether or not power is turned off (step S136). If the power is not turned off (NO in step S136), processing returns to step S118. On the other hand, when the power is turned off (YES in step S136), processing ends.

Figure 8:
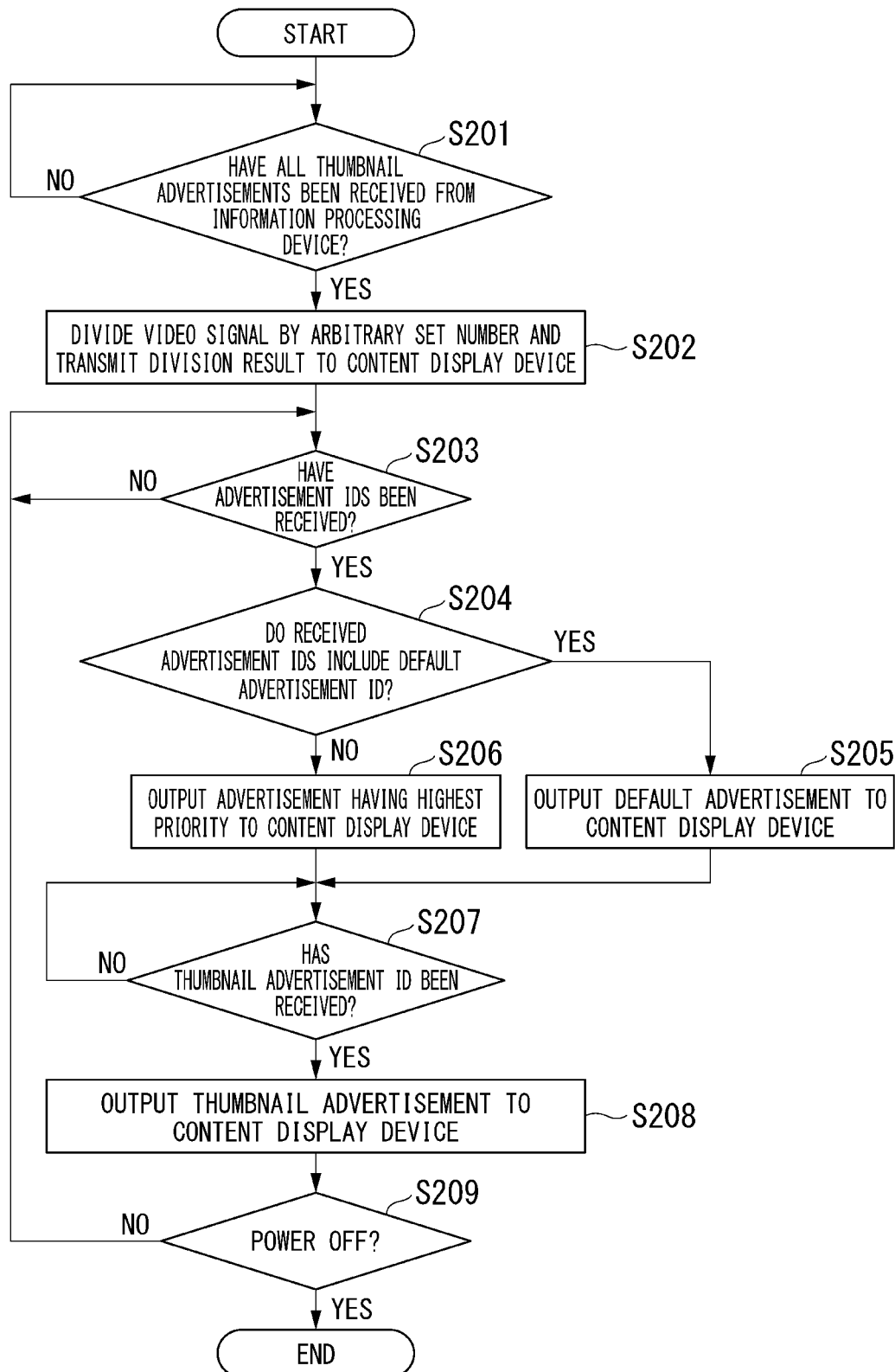
FIG. 8 is a flowchart illustrating an operation of display control processing executed by a content output device.

FIG. 8 is a flowchart illustrating the operation of display control processing executed by the content output device. When the power is turned on, the content output device 3 executes processing shown in this figure.

First, the advertisement reception unit 301 determines whether or not main advertisements and thumbnail advertisements of all advertisements have been received from the information processing device 4 (step S201). At this time, the advertisement reception unit 301 receives main advertisement IDs, thumbnail advertisement IDs, and a thumbnail advertisement display number along with the main advertisements and the thumbnail advertisements. If the main advertisements and the thumbnail advertisements of all the advertisements have not been received (NO in step S201), processing of step S201 is executed again. On the other hand, when the main advertisements and the thumbnail advertisements of all the advertisements have been received (YES in step S201), the screen division unit 305 divides the display screen of the content display device 2 into a main area and as many candidate areas as the thumbnail advertisement display number by dividing a video signal by the received thumbnail advertisement display number and outputting the result to the content display device 2 from the output unit 307 (step S202). That is, the screen division unit 305 lays out the frames of the main area and each candidate area on the display screen and allocates the main area and each candidate area to the display screen.

Subsequently, the advertisement ID reception unit 303 determines whether or not main advertisement IDs have been received from the information processing device 4 (step S203). If the main advertisement IDs have not been received (NO in step S203), processing of step S203 is repeated. On the other hand, if the main advertisement IDs have been received (YES in step S203), it is determined whether or not the received main advertisement IDs include a main advertisement ID of a default advertisement (step S204). If the main advertisement ID of the default advertisement is included (YES in step S204), the advertisement arrangement unit 306 disposes the default advertisement in the main area and outputs the video signal thereof to the content display device 2 (step S205). As a result, the content display device 2 displays the default advertisement in the main area.

On the other hand, if the received advertisement IDs do not include the main advertisement ID of the default advertisement (NO in step S204), the advertisement arrangement unit 306 disposes a main advertisement corresponding to a main advertisement ID having the highest priority among the received main advertisement IDs in the main area and outputs the video signal thereof to the content display device 2 (step S206). As a result, the content display device 2 displays the main advertisement in the main area.

Subsequently, the advertisement ID reception unit 303 determines whether or not thumbnail advertisement IDs have been received from the information processing device 4 (step S207). If the thumbnail advertisement IDs have not been received (NO in step S207), processing of step S207 is repeated. On the other hand, if the thumbnail advertisement IDs have been received (YES in step S207), the advertisement arrangement unit 306 disposes the thumbnail advertisements corresponding to the received thumbnail advertisement IDs in the candidate areas depending on their priorities and outputs the video signals thereof to the content display device 2 (step S208). As a result, the content display device 2 displays one or more thumbnail advertisements in the candidate areas depending on their priorities.

Here, although a case in which the information processing device 4 returns to step S118 after step S136 has been described above, a new image may be captured by the camera device 1 before step S118 is executed, and when a person different from the previously detected person has been detected from a result detected from the image capturing result, the display control unit 409 may switch content that is being reproduced in the candidate areas to content having attributes corresponding to the different person.

At the time of switching thumbnail advertisements to be displayed in the candidate areas, the content output device 3 may switch the thumbnail advertisements such that all the display areas slide, switch the thumbnail advertisements such that upper and lower or left and right individual thumbnail advertisements, or realize switching according to any animation.

Subsequently, the content output device 3 determines whether or not the power is turned off (step S209). If the power is not turned off (ON in step S209), processing returns to step S203. On the other hand, if the power is turned off (YES in step S209), processing ends.

In a display system that displays only one piece of content without providing a candidate area on the display screen, even if attributes of a person within the effective range of the content display device 2 are estimated, there is a time lag between delivery of content of a target advertisement targeting the person having the attributes and the estimation. Accordingly, when the content of the target advertisement is delivered, the target person is likely to be out of the effective range of the content display device 2 and thus there is a problem that the original effects of the target advertisement is weakened.

With respect to such a problem, the display control unit 409 of the information processing device 4 according to the present embodiment causes different pieces of advertisement content to be displayed in a main area, which is the largest display area of the display screen of the content display device 2, and candidate areas smaller than the main area, switch advertisements to be displayed in the candidate areas on the basis of attributes of a person within the effective range, and causes an advertisement displayed in a candidate area to be displayed in the main area at the time of switching the advertisement displayed in the main area. That is, the display control unit 409 clearly indicates a next candidate advertisement to be enlarged and displayed in the main area in a candidate area and switches thumbnail advertisements to be displayed in the candidate areas on the basis of attribute of a person within the effective range. Accordingly, the effect of attracting the interest of the person within the effective range and keeping the target person remaining within the effective range of the content display device 2 until the next main advertisement is displayed.

Further, since the display control unit 409 provides a plurality of candidate areas and displays different pieces of thumbnail advertisements therein, it is possible to provide information suitable for each of a plurality of people within the effective range of the content display device 2. In addition, in the case of an advertisement having audio, for example, it is possible to expect effects (for example, a cocktail party effect, and the like) with respect to targets that are within the effective range of the content display device 2 but do not view the display screen.

Further, the display control unit 409 switches thumbnail advertisements to be displayed in the candidate areas on the basis of attribute of a person in the effective range, and at the time of switching an advertisement displayed in the main area, displays the most viewed advertisement among the advertisements displayed in the candidate areas in the main area. Therefore, it is possible to display content having the highest appealing effect that leads to a purchase request of the target person in the main area and provide appropriate information to the target.

Further, at the time of switching thumbnail advertisements to be displayed in candidate areas, the display control unit 409 re-displays the most viewed thumbnail advertisement in a candidate area. Therefore, the thumbnail advertisement that is currently attracting the most attention from a viewer can be left in the candidate area, and the attention of the viewer can be prevented from being distracted.

Further, the display control unit 409 assigns priorities to thumbnail advertisements displayed in candidate areas on the basis of attributes of a person within the effective range of the content display device 2 and displays thumbnail advertisements in the candidate areas corresponding to the priorities. As a result, it is possible to dispose a thumbnail advertisement having the high priority based on the attributes in a candidate area (for example, a candidate area having a large display area) that is easier to view and to attract the attention of the viewer.

Further, the display control unit 409 assigns the highest priority to the most viewed advertisement at the time of switching advertisements to be displayed in candidate areas. As a result, it is possible to dispose a thumbnail advertisement that is currently attracting the most attention from a viewer in a candidate area that is most easily viewed.

Further, at the time of switching advertisements to be displayed in candidate areas, the display control unit 409 assigns priorities on the basis of the number of views if all advertisements selected on the basis of attributes of a person match the advertisements displayed in the candidate areas. That is, when all thumbnail advertisements selected on the basis of the attributes match the thumbnail advertisements that are being delivered, the display control unit 409 changes the arrangement positions of the thumbnail advertisements on the basis of the number of views thereof without switching thumbnail advertisements to be displayed in the candidate areas. As a result, a thumbnail advertisement with a larger number of views can be disposed in a candidate area that is easier to view.

Further, at the time of switching advertisements to be displayed in candidate areas, the display control unit 409 switches to advertisements other than the advertisement displayed in the main area. As a result, a thumbnail advertisement corresponding to a main advertisement that is being delivered through the main area is not displayed in a candidate area, and the same main advertisement can be prevented from being delivered twice in a row.

Further, the information processing device 4 includes the candidate advertisement display number setting unit 401 that sets the number of candidate areas. As a result, since the number of thumbnail advertisements to be displayed in candidate areas can be set to an arbitrary number, the divided screens (candidate areas) of the display screen of the content display device 2 do not become too small even if the number of pieces of contents for advertisements stored in the storage unit 403 is increased, and optimum content can be displayed without degrading the visibility, and thus information can be provided more effectively.

Further, the information processing device 4 includes the candidate advertisement switching time setting unit 402 that sets a time for switching advertisements to be displayed in candidate areas. As a result, the time for switching thumbnail advertisements to be displayed in the candidate areas can be set to an arbitrary time, and thus it is possible to reduce a time lag until a thumbnail advertisement in accordance with attributes of a person within the effective range is displayed by setting the time such that it is shorter than a time for switching a main advertisement.

Further, although the operation when the main area and the candidate areas are allocated to the display screen of the content display device 2 has been described in the above-described embodiment, a related information display area in which the content output device 3 displays a pop and the like, as shown in FIG. 2C, may be allocated to the display screen. Then, the display control unit 409 may display information related to content displayed in the candidate areas in the related information display area. Regarding the related information, the advertisement storage unit 302 may store related content associated with content in advance. Then, the display control unit 409 may display the related information in the related information display area by designating the ID of the related content stored in the advertisement storage unit 302.

In the above-described embodiment, at least some functions of the information processing device 4 may be provided in the content output device 3, and at least some functions of the content output devices 3 may be provided in the information processing device 4. Further, the information processing device 4 and the content output device 3 may be configured as one device.

Further, in the above-described embodiment, processing proceeds to step S119 if the time for determining the next main advertisement has not been reached in step S131, and thumbnail advertisements are reselected if a thumbnail advertisement switching time has been reached. As a result, the display control unit 409 can switch content displayed in candidate areas to different content in a period shorter than a reproduction period of content reproduced in the main area. As a result, the cycle in which content to be displayed in the candidate areas is switched can be updated to a cycle shorter than the cycle in which content to be displayed in the main area is switched. As a result, even if there is a change to a person passing through the area captured by the camera device 1 while a main advertisement is being reproduced, it is possible to sequentially switch content displayed in the candidate areas depending on attributes of the changed person, and thus it is possible to display content in accordance with the situation in which people have been changed in the candidate areas. In addition, it is possible to update the content in accordance with the situation in which people have been changed to employment to be displayed in the candidate areas. It is possible to select next content to be displayed in the main area from the content updated according to the change, and thus it is possible to increase the probability that the content can be viewed by a person.

Further, in the above-described embodiment, advertisement content is newly selected if the time for determining the next main advertisement has been reached in step S131. For example, the display control unit 409 may set the time for determining the next main advertisement according to timing at which the reproduction time of the main advertisement ends and may newly select advertisement content upon arrival of this time. As a result, when reproduction of content reproduced in the main area ends, the display control unit 409 can display content selected from content displayed in candidate areas in the main area and reproduce the content.

Figure 9:
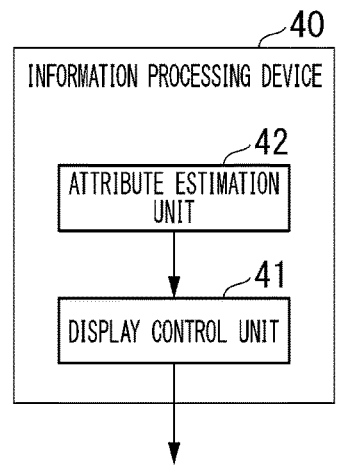
FIG. 9 is a diagram showing a basic configuration of an information processing device according to the present invention.

FIG. 9 is a diagram showing a basic configuration of an information processing device according to the present invention.

The basic configuration of the information processing apparatus 40 according to the present invention includes a display control unit 41 and an attribute estimation unit 42.

When the display area of the display screen is divided into a plurality of areas, content is reproduced in a main area among the plurality of areas, and reproduction of the content ends, the display control unit 41 ends reproduction of content reproduced in candidate areas among the plurality of areas and causes content depending on the estimated attributes to be reproduced.

The attribute estimation unit 42 detects a person from an image captured such that it includes a place where the display screen of the display device can be visually recognized and estimates attributes of the detected person.

Figure 10:
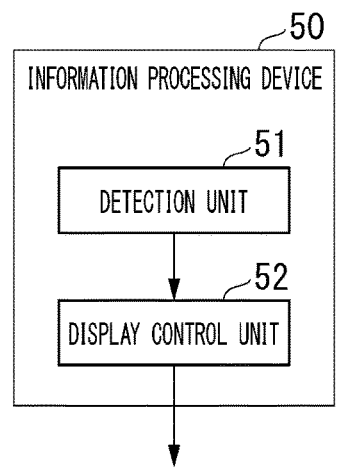
FIG. 10 is a functional block diagram showing a configuration of an information processing device 50 according to another embodiment.

FIG. 10 is a functional block diagram showing a configuration of an information processing device 50 in another embodiment.

The information processing device 50 includes a detection unit 51 and a display control unit 52.

The detection unit 51 detects a person from at least a captured image of a place where the display screen can be visually recognized.

At least a main area and a candidate area are provided on the display screen of the display device, and the display control unit 52 causes content displayed in the candidate area when reproduction of content displayed in the main area ends to be displayed in the main area.

Further, the display control unit 52 causes content corresponding to a result of processing of detecting a person in the candidate area during reproduction of the content displayed in the main area.

When a person has been detected from a captured image as a result of processing of detecting a person, the display control unit 52 causes content based on at least one of the attribute and the action of the detected person to be displayed in the candidate area. When no person is detected from a captured image as a result of processing of detecting a person, the display control unit 52 causes content based on a defined rule to be displayed in the candidate area. The defined rule may be a rule for displaying predetermined content (for example, default content) or a rule for selecting arbitrary content from a plurality of pieces of contents and displaying the selected content.

Further, when the detection unit 61 does not detect a person during reproduction of content displayed in the main area, the display control unit 52 may display content that is not dependent on people in the candidate area.

Figure 11:
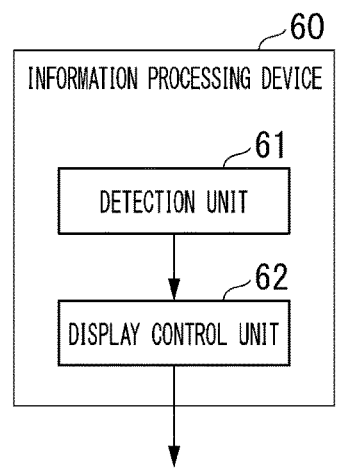
FIG. 11 is a functional block diagram showing a configuration of an information processing device 60 according to another embodiment.

FIG. 11 is a functional block diagram showing a configuration of an information processing device 60 in another embodiment.

The information processing device 60 includes a detection unit 61 and a display control unit 62.

The detection unit 61 detects a person from at least a captured image of a place where the display screen can be visually recognized.

At least a main area and a candidate area are provided on the display screen of the display device, and the display control unit 62 causes content displayed in the candidate area when reproduction of content displayed in the main area ends to be displayed in the main area.

The display control unit 62 determines the priority of content depending on the person during reproduction of the content displayed in the main area, and causes the content to be displayed in the candidate area depending on the determined priority.

Further, if no person is detected by the detection unit 61 during reproduction of the content displayed in the main area, the display control unit 62 displays content that is not dependent on people in the candidate area.

The display control unit 62 may cause content depending on the determined priority, which is different from the content displayed in the main area, to be displayed in the candidate area.

Figure 12:
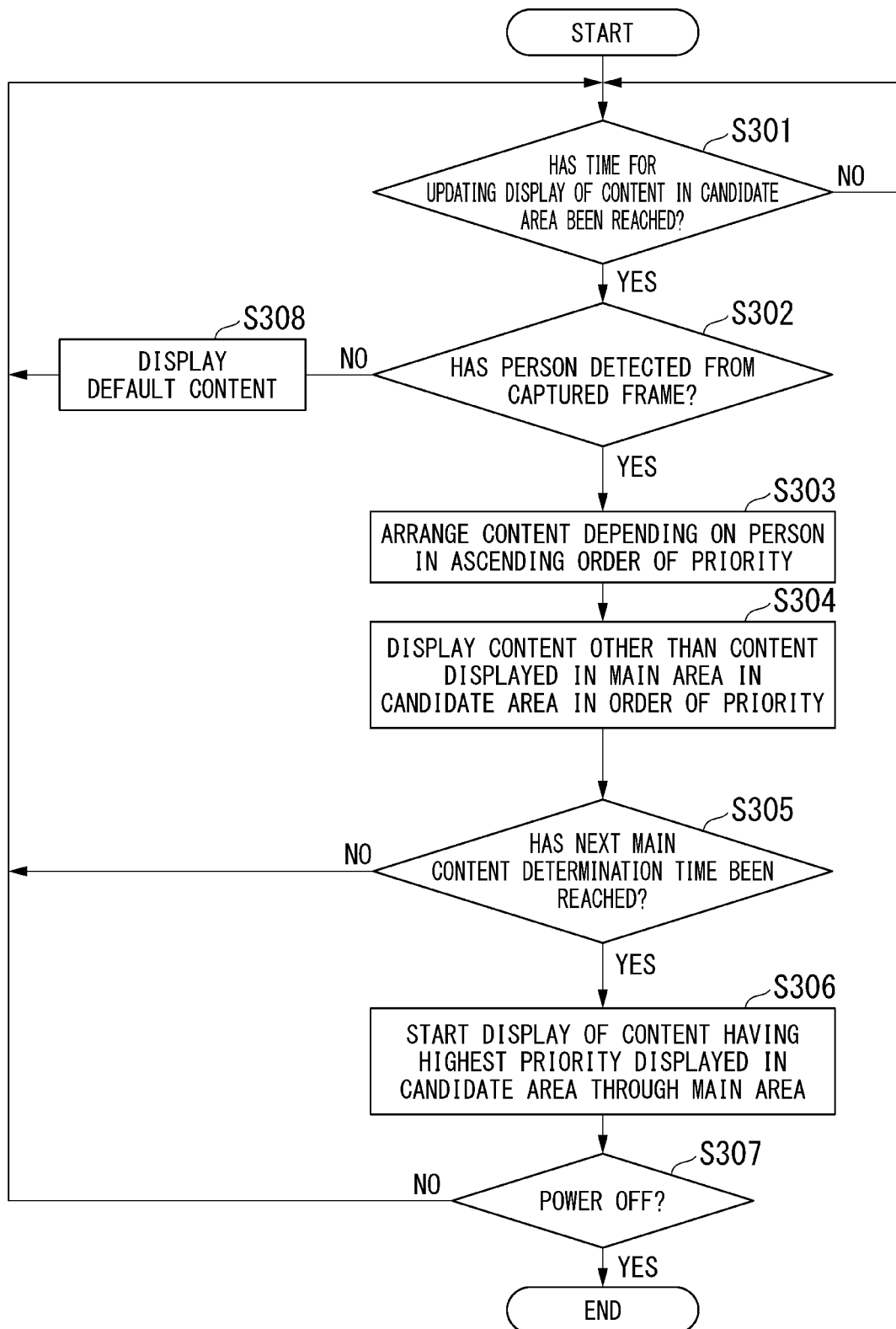
FIG. 12 is a flowchart illustrating the operation of the information processing device 60.

FIG. 12 is a flowchart illustrating the operation of the information processing device 60.

The display control unit 62 determines whether or not a timing for updating display of thumbnail advertisements has been reached (step S301), and if the timing for updating the thumbnail advertisements has not been reached (NO in step S301), processing proceed to processing of step S301 after a certain weighting time has elapsed.

The display control unit 62 determines whether or not a person has been detected from a captured image on the basis of a result of processing of detecting a person obtained from the detection unit 61 (step S302) if the update timing has been reached (YES in step S301), and if a person has been detected (YES in S302), determines priorities depending on the detected person and arranges content depending on the determined priorities (step S303).

The display control unit 62 may perform processing of arranging the content by assigning the order of arranging the content to the content. In this case, since the processing does not change the order of content displayed in candidate areas at this point in time, the order of the content displayed in the candidate areas is not changed at this point in time. For example, the processing of arranging the content can be performed as background processing.

A priority depending on a person may be, for example, a priority according to estimated attributes of the person or a priority according to a detected action of the person. As for an action of a person, for example, when the line of sight of the person is detected and the line of sight is directed to content displayed in a candidate area, it may be determined that the priority of the content is high. In addition, a priority according to a person may be both an attribute and an action.

When content is arranged, the display control unit 62 arranges the content in descending order of priority.

The display control unit 62 causes content other than the content displayed in the main area among content arranged in ascending order of priority to be displayed in candidate areas in the order of priority (step S304). Here, if there is one candidate area, the display control unit 62 causes content having the highest priority among the content other than the content displayed in the main area to be displayed in the candidate area. If there are a plurality of candidate areas, the display control unit 62 causes content other than the content displayed in the main area in the candidate areas in ascending order of priority.

Content displayed in the candidate areas by executing step S304 may be different from or identical to content before the execution. If the person detected in the captured image is different from the previous one (such as a case in which a different person has been detected and a case in which a combination of detected multiple people is different from the previous one), different content may be displayed. If the person detected in the captured image is the same as the previous one (such as a case in which the same person is at the same position), the same content may be displayed.

In processing based on the above-described flowchart, processing of displaying content corresponding to the person in the candidate area may be performed or processing of displaying default content in the candidate area may be performed before step S301.

The display control unit 62 determines whether or not the time for determining next content to be displayed in the main area has been reached (step S305), and if the time for determining the next content to be displayed in the main area has not been reached (NO in step S305), processing proceeds to step S301.

On the other hand, when if time for determining the next content to be displayed in the main area has been reached, the display control unit 62 causes content having the highest priority displayed in the candidate area to be displayed in the main area (step S306).

The display control unit 62 ends processing if an instruction to turn off the power is input (YES in step S307), and processing proceeds to step S301 if the instruction to turn off the power is not input.

On the other hand, if no person is detected in step S302 (NO in step S302), the display control unit 62 displays default content in the candidate area (step S308).

In the above-described processing, the display control unit 62 may execute processing of step S308 when predetermined conditions are satisfied. For example, the display control unit 62 may execute the processing when a certain period of time has elapsed from when no person is detected from the captured image.

Further, position detection may be performed by recording a program for realizing each function of the camera device, the content display device, the content output device, and the information processing device in FIG. 3 on a computer-readable recording medium and causing a computer system to read and execute the program recorded on the recording medium. Meanwhile, it is assumed that the "computer system" mentioned here includes an OS and hardware such as peripheral devices.

In addition, it is assumed that the "computer system" also includes homepage providing environment (or display environment) if the WWW system is used.

Further, the "computer-readable recording medium" refers to a portable medium such as a flexible disk, a magneto-optical disk, a ROM, or a CD-ROM, or a storage device such as a hard disk built in a computer system. Further, it is assumed that the "computer-readable recording medium" includes a medium that holds a program for a certain period of time, such as a volatile memory inside a computer system that is a server or a client. Further, the above-mentioned program may be for realizing some of the above-described functions and can be realized by combining the above-described functions with a program that has already been recorded in the computer system. Further, the above-mentioned program may be stored in a predetermined server and may be distributed (downloaded or the like) via a communication line in response to a request from another device.

Although the embodiments of the present invention have been described above in detail with reference to the drawings, the specific configuration is not limited to the embodiments and also includes a design and the like within a range that does not deviate from the gist of the present invention.

REFERENCE SIGNS LIST

100 Display system
1 Camera device
101 Imaging unit
102 Transmission unit
2 Content display device
201 Input unit
202 Display unit
3 Content output device
301 Advertisement reception unit
302 Advertisement storage unit
303 Advertisement ID reception unit
304 Advertisement reading unit
305 Screen division unit
306 Advertisement arrangement unit
307 Output unit
4, 40 Information processing device
401 Candidate advertisement display number setting unit
402 Candidate advertisement switching time setting unit
403 Storage unit
404 Advertisement ID assignment unit
405 Advertisement transmission unit
406 Captured image acquisition unit
407, 42 Attribute estimation unit
408 Viewing advertisement identification unit
409, 41 Display control unit
4091 Thumbnail advertisement selection unit
4092 Priority determination unit
4093 Advertisement ID transmission unit
4094 Main advertisement selection unit

What is claimed is:

1. An information processing device comprising:
a unit controller which causes content displayed in a candidate area when reproduction of content displayed in a main area ends to be displayed in the main area, at least the main area and the candidate area being provided on a display screen of a display device comprising an electric signboard for digital signage; and
a detector which detects a person from a captured image of at least a place where the display screen is visually recognizable,
wherein the display controller changes the content displayed in the candidate area depending on the person during reproduction of the content displayed in the main area,
wherein the electric signboard for digital signage, controlled by the display controller, is configured to switch the content displayed in the candidate area to different content with a shorter period than a reproduction period of the content reproduced in the main area.

2. The information processing device according to claim 1, wherein the display control unit changes the content displayed in the candidate area to other content depending on the person.

3. The information processing device according to claim 1, wherein the display control unit rearranges the contents displayed in the candidate area depending on the person.

4. The information processing device according to claim 1, further comprising:
an attribute estimation unit which estimates attributes of the person detected by the detection unit,
wherein, when content is displayed in the candidate area, the display control unit causes content depending on the estimated attributes to be displayed instead of the content displayed in the candidate area.

5. The information processing device according to claim 4, wherein the display control unit assigns priorities to a plurality of pieces of content on the basis of the estimated attributes, causes content having a highest priority to be displayed in the candidate area, and causes at least content having a next highest priority to be displayed in another area of the display screen.

6. The information processing device according to claim 5, further comprising:
a viewing advertisement identification unit which identifies lines of sight directed to the content displayed at least in the candidate area and the other area,
wherein the display control unit further changes the priorities on the basis of the lines of sight and causes content having a highest changed priority to be displayed in the candidate area.

7. The information processing device according to claim 4, wherein, when a different person is detected from an image captured after detection of the person, the display control unit switches the content reproduced in the candidate area to content depending on attributes of the different person.

8. The information processing device according to claim 1, wherein, when content is displayed in the candidate area, the display control unit causes content depending on an action of the detected person to be displayed instead of the content displayed in the candidate area.

9. The information processing device according to claim 1, wherein the display control unit causes information related to the content displayed in the candidate area to be displayed in a part of the display screen.

10. The information processing device according to claim 1, wherein the display control unit causes content based on a defined rule to be displayed in the candidate area when no persons have been detected from the captured image.

11. The information processing device according to claim 1, wherein the display control unit displays content that is not dependent on a person in the candidate area when no persons have been detected by the detection unit during reproduction of the content displayed in the main area.

12. An information processing device comprising:
a display controller which causes content displayed in a candidate area when reproduction of content displayed in a main area ends to be displayed in the main area, at least the main area and the candidate area being provided on a display screen of a display device comprising an electric signboard for digital signage; and
a detector which detects a person from a captured image of at least a place where the display screen is visually recognizable,
wherein the display controller changes the content displayed in the candidate area depending on the person during reproduction of the content displayed in the main area,
wherein the electric signboard for digital signage, controlled by the display controller, is configured to have the content that is displayed in the candidate area being content generated on the basis of at least some of a plurality of frames constituting the content displayed in the main area.

13. A display control method comprising:
causing, by a display controller, content displayed in a candidate area when reproduction of content displayed in a main area ends to be displayed in the main area, at least the main area and the candidate area being provided on a display screen of a display device comprising an electric signboard for digital signage; and
detecting, by a detector, a person from a captured image of at least a place where the display screen is visually recognizable,
wherein the display controller changes the content displayed in the candidate area depending on the person during reproduction of the content displayed in the main area, and
wherein the electric signboard for digital signage, controlled by the display controller, is configured to switch the content displayed in the candidate area to different content with a shorter period than a reproduction period of the content reproduced in the main area.

* * * * *